United States Patent [19]

Anderson

[11] Patent Number: 4,469,821
[45] Date of Patent: Sep. 4, 1984

[54] LOW SMOKE, HALOHYDROCARBON-COMPATIBLE URETHANE-ISOCYANURATE FOAM COMPOSITIONS

[75] Inventor: James J. Anderson, Richmond, Va.

[73] Assignee: Mobil Oil Corporation, New York, N.Y.

[21] Appl. No.: 524,054

[22] Filed: Aug. 17, 1983

[51] Int. Cl.$^3$ .................... C08G 18/14; C08G 18/42
[52] U.S. Cl. .................................. 521/131; 521/173; 521/902; 521/172
[58] Field of Search ............... 521/902, 172, 173, 131

[56] References Cited

U.S. PATENT DOCUMENTS

| | | | |
|---|---|---|---|
| 3,647,759 | 3/1972 | Walker | 260/75 R |
| 4,223,068 | 9/1980 | Carlstrom et al. | 428/310 |
| 4,237,238 | 12/1980 | DeGuiseppi et al. | 521/131 |
| 4,346,229 | 8/1982 | Derr et al. | 560/91 |
| 4,394,286 | 7/1983 | Millick | 252/182 |

*Primary Examiner*—H. S. Cockeram
*Attorney, Agent, or Firm*—Alexander J. McKillop; Michael G. Gilman; Edward J. Trojnar

[57] ABSTRACT

Compositions having improved compatibility of halohydrocarbon blowing agents such as trichlorofluoromethane and suitable for curing with polyisocyanates to give low smoke urethane isocyanate foams are described. The compositions include the transesterification products of the residue obtained from the manufacture of dimethyl terephthalate and ethylene glycol or a polyethylene glycol; the transesterification product of that residue and a higher alkylene glycol or higher polyalkylene glycol; and a polyether polyol having an average hydroxyl functionality of at least 4.

19 Claims, No Drawings

LOW SMOKE, HALOHYDROCARBON-COMPATIBLE URETHANE-ISOCYANURATE FOAM COMPOSITIONS

SUMMARY OF THE INVENTION

This invention is directed to resinous polyhydroxy resin compositions, derived from the residue of dimethyl terephthalate or terephthalic acid production, which are compatible with halohydrocarbon blowing agents and which can be cured by reaction with organic polyisocyanates to give low smoke foams having good physical properties. The polyhydroxy derivatives of the aforementioned residues are commonly used in the preparation of polyisocyanurate-polyurethane foams by reaction with polyisocyanate in which halohydrocarbon blowing agents are used. Such foam compositions are described in U.S. Pat. Nos. 4,237,238 and 3,647,759 which are incorporated herein by reference. It is advantageous in producing such foams that the blowing agent and the polyhydroxy component be compatible without separation for extended periods prior to mixing with polyisocyanate. Known polyhydroxy residue derivatives exhibit poor compatibility with halohydrocarbon blowing agents which quickly separate from the polyhydroxy resin in two days or less. In accordance with this invention, polyhydroxy resin compositions are provided which are compatible with halohydrocarbon blowing agent for extended periods of over 3 days, even 60 days and longer, without separation of the halohydrocarbon. In addition, the foams produced from such compositions have other desirable physical properties.

DETAILED DESCRIPTION OF THE INVENTION

The compositions of this invention, curable by reaction with organic polyisocyanate to a polymer foam in which the predominant recurring polymer unit is isocyanurate, comprise I. a halogenated organic blowing agent;
II. a polyester polyol mixture prepared by
  (a) transesterification, with a glycol of molecular weight from about 60 to about 400, of a residue remaining after dimethyl terephthalate and methyl p-toluate have been removed from the product of oxidation of p-xylene in the preparation of dimethyl terephthalate; or
  (b) esterification, with an alkylene oxide selected from the group consisting of ethylene oxide, propylene oxide, butylene oxide, and mixtures thereof, of a carboxyl functional residue resulting from the removal of terephthalic acid from the mixture obtained by the oxidation of p-xylene in the preparation of terephthalic acid; and
III. a polyether polyol having an average hydroxyl functionality of at least 4 comprising the adduct of at least 4 moles of a $C_2$–$C_6$ alkylene oxide and an organic compound having at least 4 functional groups reactive with said alkylene oxide.

The polyol mixture II contains both ethylene glycol or polyethylene glycol derivatives of the described residue and sufficient higher alkylene glycol, or higher polyalkylene glycol derivatives of the residue to render said composition compatible without separation of said halogenated organic blowing agent for at least 3 days and capable of use to prepare a foam with a Class I flame rating. Much longer stability to separation of blowing agents is desirable, for example at least 60 days. Stability for periods in excess of 120 days has been achieved.

In another aspect of the invention compositions without the halogenated hydrocarbon blowing agent I, with or without added flame retardant, are contemplated. Analogous compositions with different polyester polyols, to which a blowing agent is added later are common in commerce. It is highly advantageous that the polyester polyol mixture be compatible with the blowing agent which may be introduced by a formulator for sale to a user or by the ultimate user who typically requires storage stability for at least several days before the polyhydroxy component is reacted with polyisocyanate.

The "residue" from which the polyester polyol component II is prepared is described in more detail in U.S. Pat. Nos. 3,647,759 and 4,237,238. The residue is the product remaining after dimethyl terephthalate and methyl p-toluate have been removed from the product of oxidation of p-xylene in the preparation of dimethyl terephthalate. Alternatively, the residue can comprise the product remaining after the removal of terephthalic acid from the mixture obtained by the oxidation of p-xylene in the preparation of terephthalic acid. In the first case, the residue contains ester groups which are transesterified with a glycol such as ethylene glycol in order to prepare the polyester polyol. In the latter case, the residue contains carboxyl groups which can be esterified with an alkylene oxide such as ethylene oxide, propylene oxide or butylene oxide to prepare a similar polyester polyol mixture. It has been determined that the polyester polyol, derived by the transesterification of the residue with ethylene glycol, diethylene glycol or a higher polyethylene glycol, or by a esterification with of an acid residue ethylene oxide, does not have adequate compatibility with halohydrocarbon blowing agents which separate out in a short period of time, often in one day or less. In accordance with this invention, it has been determined that a mixture of polyester polyols derived from ethylene glycol, and from a higher glycol, for example, propylene glycol exhibit much better compatibility with halohydrocarbon and also exhibit other advantageous physical properties when used in the preparation of polyisocyanurate-polyurethane foams.

The mixtures of ethylene glycol and higher glycol derivatives can be made by separately preparing the polyester polyol derived from ethylene glycol and the polyester polyol derived from the higher alkylene glycol, or a mixture of ethylene and higher alkylene glycol can be reacted with the residue. Likewise, the polyester polyols can be prepared by transesterification or by esterification of the appropriate residue with diethylene glycol, di(higher alkylene) glycol, polyethylene glycol, or poly(higher alkylene) glycol.

Preferably, the polyester polyol component contains a stoichiometric excess of glycol or alkylene oxide component which serves as a reactive solvent or diluent for the polyester polyol.

Another essential component of the compositions of this invention is a polyether polyol III having an average hydroxyl functionality of at least four which comprises the adduct of at least four moles of a $C_2$–$C_6$ alkylene oxide and an organic compound having at least four functional groups reactive with the alkylene oxide. The organic compound preferably contains hydroxyl groups as the functional groups. Suitable polyether polyols are obtained by reaction of alkylene oxides with sucrose, methylglucoside, pentaerythritol, sorbitol and mixtures thereof. It has been found advantageous to include polyether polyols derived from alkyl polyamines or aryl polyamines. Preferably, the amine-derived polyether polyol is only part of the polyether polyol mixture in which the predominant component is one derived from a polyhydroxy organic compound.

Generally, the ratio of mixed polyester polyol component II to polyether polyol component III is 75:25 to 95:5. More preferably, the ratio is from 85:15 to 95:5. The mixture of polyester polyols comprising component II generally comprises an ethylene glycol, diethylene glycol, polyethylene glycol or ethylene oxide derivative which contain from about 5 to 50 weight percent of a corresponding polyester polyol derived from higher glycol or higher alkylene oxide. Preferably, the higher glycol or alkylene oxide is a propylene glycol or propylene oxide.

Typically, the foam compositions of this invention contain flame retardant, preferably organic compounds containing both halogen and phosphorus. Tris(beta-chloropropyl) phosphate is particularly preferred.

Halogenated organic blowing agents are well known in the art. Preferred blowing agents are trichlorofluoromethane and dichlorodifluoromethane.

The ratio of isocyanate equivalents in the organic polyisocyanate and the total hydroxy equivalents in components II and III can vary widely but in general is in the range of 1.5:1 to 4.0:1 and preferably in the range of 2.0:1 to 3.0:1.

It has been found that the addition of non-ionic surfactant is often beneficial. Suitable surfactants are well known in the art. The non-ionic surfactant is not a necessary ingredient of the compositions of this invention and, when used, should be present in a maximum of about 2 weight percent to prevent loss of desirable foam properties.

The compositions of this invention are particularly useful for the preparation of low smoke, rigid isocyanurate foams which are suitable for use in building applications. Many national and local building codes specify smoke values for rigid polyurethane, polyisocyanurate or hybrid foams of 450 maximum as measured by ASTM E-84. The specification relates to the foam as applied. This often means rigid foams must meet the smoke requirement when tested at 0.5, to 4.0 or more inch thicknesses. The difficulty in achieving low smoke values and acceptable physical properties along with halohydrocarbon blowing agent compatibility is recognized in the art. The compositions of this invention are capable of meeting all of these requirements. In particular, the compositions of this invention can be prepared into rigid foams of 2–4 inch thickness which are halohydrocarbon compatible for 60 days and longer and which have the necessary physical properties such as dimensional stability.

Representative foam compositions in accordance with this invention are described in the examples, which are illustrative and non-linking. All amounts are expressed in parts by weight unless otherwise stated.

EXAMPLES 1-4 AND COMPARATIVE EXAMPLES A-D

A mixture of 4,841 grams Terate 203, 1,050 grams of tris (beta-chloropropyl) phosphate, 96 grams DC 193, 96 grams TMR-2, 25 grams Polycat 8 and 2,450 grams trichloromonofluoromethane (R-11) was stirred thoroughly using a two blade, propeller stirrer powered by a 0.25 HP drill at 1,500 RPM. After replacing R-11 lost due to evaporation, 8,942 grams of polymethylene poly(phenyl isocyanate) were added followed by agitation as above for 55 seconds. The mixture was poured into a 26"×60"×12" cardboard box and allowed to free rise. The mixture creamed at 22 seconds and was fully risen (approximately 16" height) and tack free in 160 seconds.

The foam was allowed to stand at room temperature for two days after which it and a duplicate bun were cut to provide five slabs (4"×24"×60") needed for ASTM E-84 flame testing.

The polyols, phosphate, surfactant, catalyst and R-11 blend described above was duplicated on a smaller scale and was allowed to stand at 67°–73° F. for periodic evaluation for R-11 separation. The composition described above was designated Comparative Example A. In a similar manner compositions corresponding to Comparative Examples B–D, and Examples 1–4 in accordance with this invention, were prepared and evaluated. The results are set forth in the Table below.

TABLE

| EXAMPLE | Comp. A | Comp. B | Comp. C | 1 | 2 | 3 | 4 | Comp. D |
|---|---|---|---|---|---|---|---|---|
| COMPONENT A | | | | | | | | |
| Polymeric Isocyanate | 51.09 | 50.61 | 51.11 | 51.60 | 52.12 | 52.51 | 53.26 | 50.21 |
| COMPONENT B | | | | | | | | |
| Polyester Polyol | | | | | | | | |
| Type I, Terate 203 | 27.66 | 26.98 | 20.35 | 18.39 | 16.70 | 17.46 | 13.72 | 19.97 |
| Type II, Res D 173 | 0.00 | 0.00 | 6.07 | 6.13 | 6.15 | 6.26 | 5.95 | 0.00 |
| Polyether Polyol | 0.00 | 0.00 | 0.00 | 1.30 | 2.49 | 2.61 | 4.82 | 8.56 |
| Tris (beta-Chloropropyl) Phosphate | 6.00 | 5.98 | 6.07 | 6.13 | 6.15 | 6.26 | 5.95 | 5.99 |
| Non-Ionic Surfactant | 0.00 | 1.48 | 1.50 | 1.52 | 1.52 | 0.00 | 1.47 | 0.00 |
| Silcone Surfactant | 0.55 | 0.42 | 0.42 | 0.41 | 0.38 | 0.40 | 0.37 | 0.57 |
| TMR-2 Catalyst | 0.55 | 0.42 | 0.42 | 0.41 | 0.38 | 0.40 | 0.37 | 0.57 |
| Polycat 8 Catalyst | 0.14 | 0.10 | 0.10 | 0.10 | 0.10 | 0.10 | 0.10 | 0.14 |
| Trichlorofluoromethane (R-11) | 14.00 | 14.01 | 14.00 | 14.01 | 14.01 | 14.00 | 14.00 | 13.98 |
| Ratio Polyester/Polyether | 100/0 | 100/0 | 100/0 | 95/5 | 90/10 | 90/10 | 80/20 | 70/30 |
| R-11 Compatability, Days | <1 | <1 | <2 | >130 | >130 | >137 | >137 | <1 |
| Flame Date, ASTM E-84, 4"Sample Thickness | | | | | | | | |
| Flame Spread Index | 20 | 20 | ND | 20 | 18 | ND | 20 | 20 |
| Smoke Development Index | 205 | 373 | ND | 296 | 392 | ND | 481 | 528 |

The several components used in the composition in the Table are specifically identified as follows. Polymeric Isocyanate is a polymethylene poly(phenyl isocyanate) with an average functionality of about 2.5 and an NCO content of 32 percent.

Polyester polyol, Type I is Terate 203 commercially available from Hercules Inc. and is believed to be a product prepared by transesterification of the residue of a dimethyl terephthalate esterified oxidate reaction product with an excess of diethylene glycol, as described in U.S. Pat. No. 3,647,759 and 4,237,238 which are incorporated herein by reference.

Polyester Polyol, Type II is an experimental product obtained from Hercules Inc., identified as Res D 173 and is believed to be a transesterification product similar to, and prepared in a similar manner to, the Type I material described above except that the glycol used for transesterification includes a polypropylene glycol, probably dipropylene glycol and also in a stoichiometric excess.

Polyether Polyol is a commercially available sucrose-amine based polyol having a hydroxyl number of 530 mgKOH/g (NIAX FAF 529-Union Carbide.)

Non-Ionic Surfactant is p-$C_8H_{17}O(CH_2CH_2O)_nH$, in which n is 12 (average).

Silicone Surfactant is a commercially available material supplied by Dow Corning Chemical as DC 193. TMR-2 Catalyst is an isocyanurate catalyst, commercially available from Air Products. Polycat 8 Catalyst is a urethane catalyst, commercially available from Abbott Chemical.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the following claims.

I claim:

1. A composition curable by reaction with organic polyisocyanate to a polymer foam in which the predominant recurring polymer unit is isocyanurate, comprising
   I. a halogenated organic blowing agent;
   II. a polyester polyol mixture prepared by
      (a) transesterification, with a glycol of molecular weight from about 60 to about 400, of a residue remaining after dimethyl terephthalate and methyl p-toluate have been removed from the product of oxidation of p-xylene in the preparation of dimethyl terephthalate; or
      (b) esterification, with an alkylene oxide selected from the group consisting of ethylene oxide, propylene oxide, butylene oxide, and mixtures thereof, of a carboxyl functional residue resulting from the removal of terephthalic acid from the mixture obtained by the oxidation of p-xylene in the preparation of terephthalic acid; and
   III. a polyether polyol having an average hydroxyl functionality of at least 4 comprising the adduct of at least 4 moles of a $C_2$–$C_6$ alkylene oxide and an organic compound selected from the group consisting of sucrose, methyl glucoside, pentaerythritol, sorbitol and mixtures thereof; said polyol mixture II containing both ethylene glycol or polyethylene glycol derivatives of said residue and sufficient higher alkylene glycol, or higher polyalkylene glycol derivatives of said residue to render said composition compatible without separation of said halogenated organic blowing agent and capable of use to prepare a foam with a Class I flame rating.

2. The composition of claim 1 which is compatible without separation of said halogenated organic blowing agent for at least 3 days.

3. The composition of claim 1 which is compatible without separation of said halogenated organic blowing agent for at least 60 days.

4. The composition of claim 1 in which II comprises a mixture of ethylene glycol or polyethylene glycol derivatives, and 5 to 50 weight percent of said higher alkylene glycol or higher polyalkylene glycol derivatives.

5. The composition of claim 4 in which said higher alkylene glycol is propylene glycol and said higher polyalkylene glycol is polypropylene glycol.

6. The composition of claim 1 in which said polyether polyol III contains, in addition, the adduct of an alkylene oxide and an organic compound selected from the group of alkylpolyamines and arylpolyamines.

7. The composition of claim 1 containing, in addition, a flame retardant.

8. The composition of claim 1 containing, in addition, an organic halogen and phosphorus containing compound.

9. The composition of claim 1 containing, in addition, tris(beta-chloropropyl) phosphate.

10. The composition of claim 1 in which said halogenated organic blowing agent is trichlorofluoromethane.

11. The composition of claim 1 in which said halogenated organic blowing agent is dichlorodifluoromethane.

12. The composition of claim 1 which contains, in addition, a non-ionic surfactant.

13. The composition of claim 1 in which
   I. is trichlorofluoromethane or dichlorodifluoromethane;
   II. comprises a mixture of ethylene glycol or polyethylene glycol derivatives and 5 to 50 weight percent of said higher alkylene glycol or higher polyalkylene glycol derivatives.

14. The composition of claim 1 in which the ratio of II to III is 75:25 to 95:5.

15. The composition of claim 1 in which the ratio of II to III is 85:15 to 95:5.

16. The composition of claim 1 which contains, in addition, an organic polyisocyanate.

17. A polyisocyanurate foam prepared by curing the composition of claim 16.

18. The composition of claim 16 in which the ratio of isocyanate equivalent in said organic polyisocyanate and the total hydroxyl equivalents in II and III is 1.5:1 to 4.0:1.

19. The composition of claim 16 in which the ratio of isocyanate equivalents in said organic polyisocyanate and the total hydroxyl equivalents in II and III is 2.0:1 to 3.0:1.

* * * * *